Feb. 18, 1964   G. J. SENNHAUSER ETAL   3,121,594
BRAKE CYLINDER VALVE MECHANISM
Filed Feb. 23, 1962   3 Sheets-Sheet 1
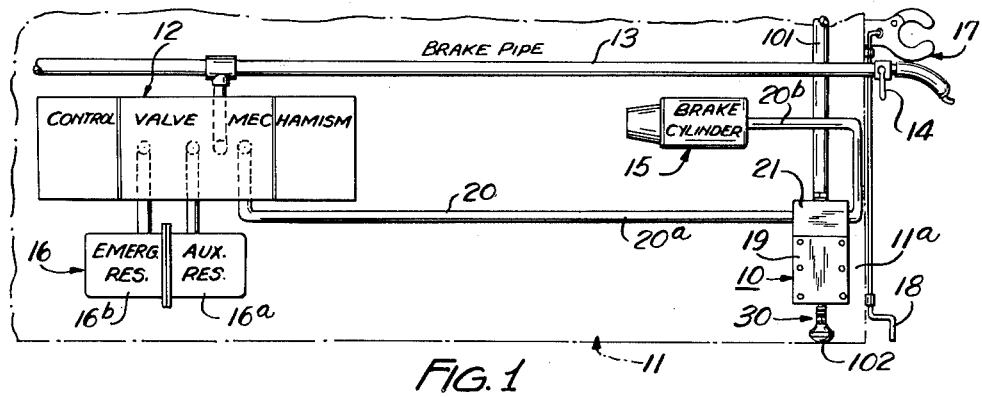
FIG. 1
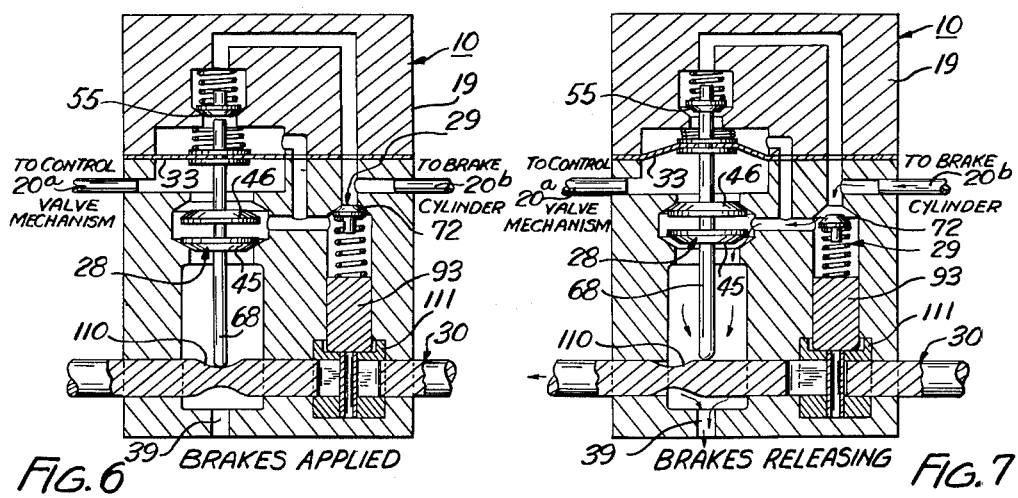
FIG. 6 — BRAKES APPLIED
FIG. 7 — BRAKES RELEASING
FIG. 8 — BRAKES RELEASED
FIG. 9 — RETAINED BRAKE CYLINDER PRESSURE
INVENTORS
GEORGE J. SENNHAUSER
JOHN A. BURKE
BY Williams, David,
Hoffmann & Jount
ATTORNEYS

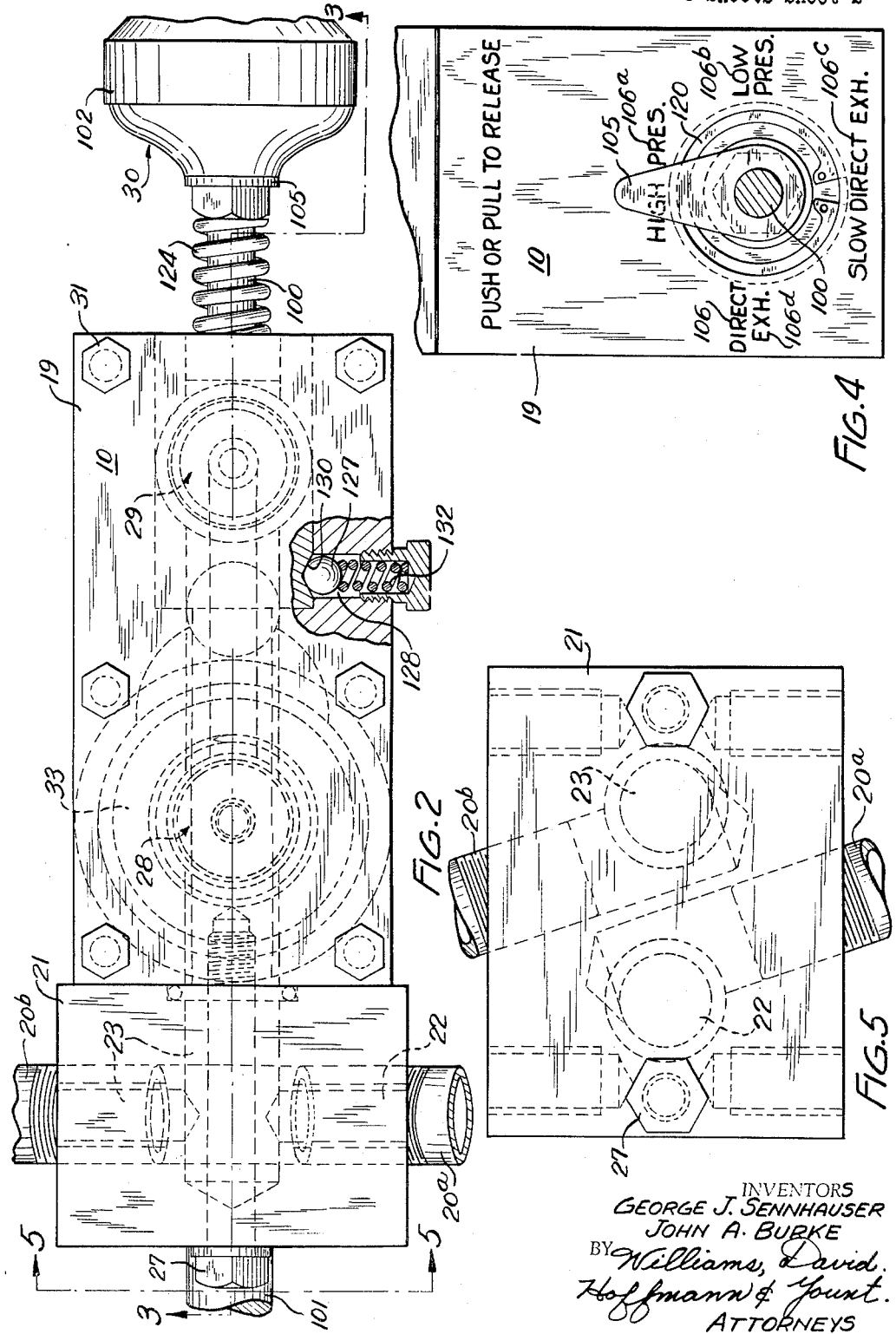

Feb. 18, 1964 G. J. SENNHAUSER ETAL 3,121,594
BRAKE CYLINDER VALVE MECHANISM
Filed Feb. 23, 1962 3 Sheets-Sheet 3

INVENTORS
GEORGE J. SENNHAUSER
JOHN A. BURKE
BY Williams, David,
Hoffmann & Yount
ATTORNEYS United States Patent Office 3,121,594
Patented Feb. 18, 1964

3,121,594
BRAKE CYLINDER VALVE MECHANISM
George J. Sennhauser, Parma, and John A. Burke, Cleveland Heights, Ohio, assignors to The Chesapeake and Ohio Railway Company, Cleveland, Ohio, a corporation of Virginia
Filed Feb. 23, 1962, Ser. No. 175,231
10 Claims. (Cl. 303—79)

This invention relates to fluid operated brake apparatus for vehicles and, more particularly, to brake cylinder control valve means of the general type by which venting of brake cylinder pressure for release of the brakes can be accomplished quickly and without also venting the fluid pressure of the storage reservoirs.

Various forms of brake cylinder pressure releasing valve devices and brake cylinder pressure retaining valve devices have been proposed heretofore. Such pressure releasing valve devices produce a quick venting of brake cylinder pressure to atmosphere when manually actuated to the open-vent condition, and have frequently been incorporated in or attached to control valve mechanisms of the triple valve type such as a conventional AB control valve mechanism. The manual operating means has usually been in the form of pull-rod means or the like extending from the control valve mechanism so as to be accessible on opposite sides of the vehicle, usually at a location intermediate the ends of the vehicle.

Brake cylinder pressure retaining valve devices have been commonly used heretofore to retain pressure in the brake cylinder for maintaining a desired amount of brake application, such as for retarding downhill acceleration of the vehicle and for maintaining a brake-applied condition while the storage reservoirs are being recharged. Such retaining valve devices are manually settable to a desired retaining pressure and have usually been located in relatively high places on the end portions of the vehicles, and the operator has had to climb onto the vehicles to actuate the retaining valve devices thereof.

As one of the objects thereof, this invention provides novel brake cylinder release valve means comprising a unitary mechanism incorporating both a brake cylinder vent valve device and a brake cylinder pressure retaining valve device, so that these valve devices can be made conveniently accessible for manual actuation by suitably locating the unitary mechanism on a car or vehicle, such as on the same end portion as that on which the usual angle cock and coupler actuating lever are located.

Another object is to provide such a unitary brake cylinder release valve mechanism incorporating both a vent valve device and a retaining valve device, and also comprising a common actuating means common to both valve devices.

A further object is to provide novel brake cylinder release valve mechanism of the character above referred to and whose common actuating means has two directions of movement, and wherein the vent valve device is responsive to the movement in one direction and the retaining valve device is responsive to the movement in another direction.

Additionally, this invention provides a novel brake cylinder pressure release unit comprising a vent valve device and a retaining valve device in a parallel-axes relation in a common housing, and actuating means common to the two valve devices and extending transverse to the parallel axes thereof and having two directions of movement for causing selective actuation of the two valve devices.

Other objects, novel characteristics and advantages of this invention will be apparent in the following detailed description and in the accompanying drawings forming a part of this specification and in which:

FIG. 1 is a plan view of a diagrammatic form showing a portion of a vehicle having the novel brake cylinder release valve mechanism of this invention thereon, and also showing the location of such release valve mechanism relative to other components of the brake apparatus;

FIG. 2 is a top plan view showing the novel brake cylinder release valve mechanism on a larger scale;

FIG. 4 is mainly a partial end elevation of the outer end of the novel valve mechanism, the view being taken as indicated by section line 4—4 of FIG. 3;

FIG. 5 is an end elevation of the novel valve mechanism when viewed from the inner end thereof as indicated by the line 5—5 of FIG. 2;

Figure 10:
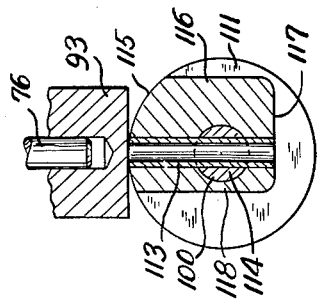
Figure 3:
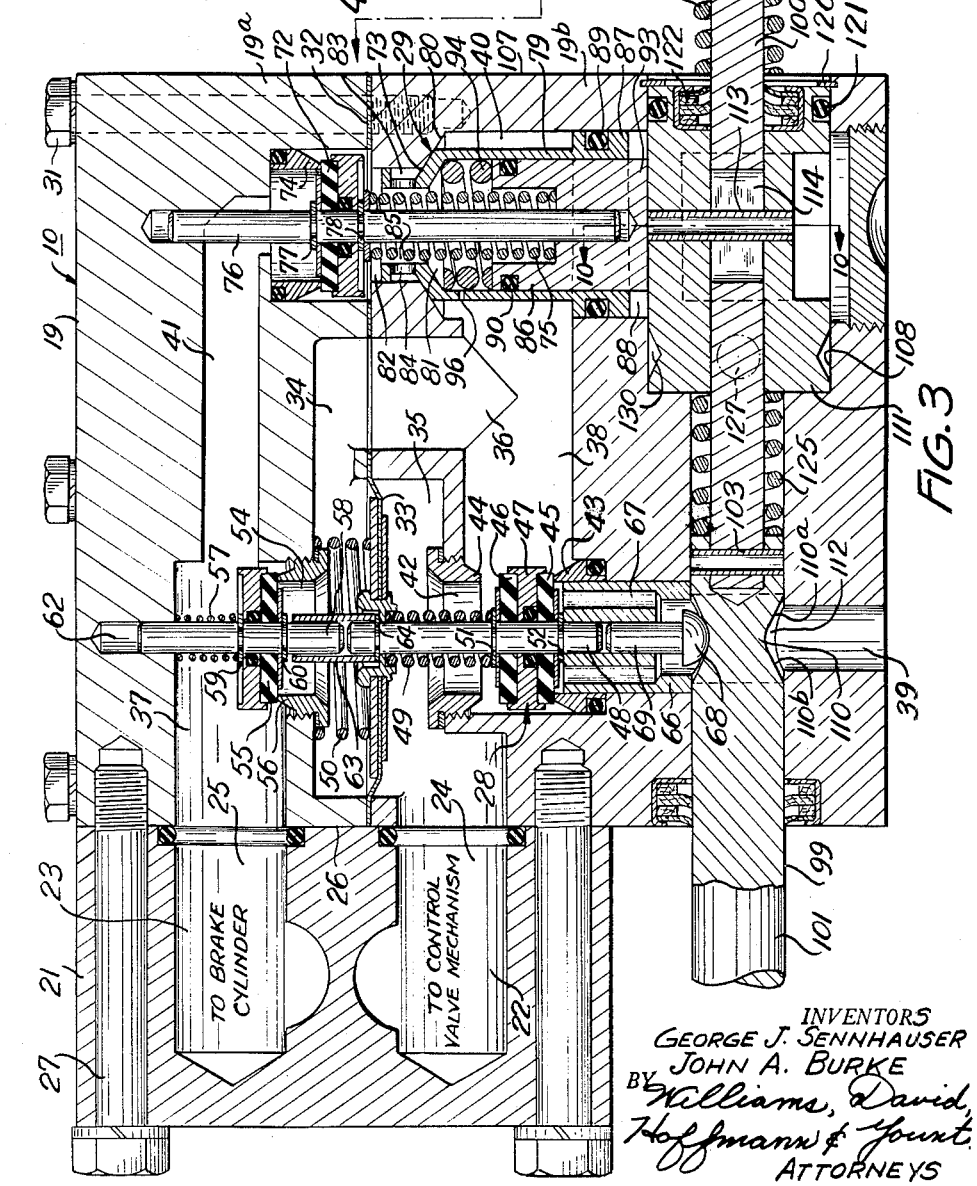
FIG. 3 is a vertical section taken through the novel valve mechanism on section line 3—3 of FIG. 2.

FIGS. 6 to 9 inclusive are diagrammatic sectional views generally similar to FIG. 3 but showing different operating conditions of the novel valve mechanism; and FIG. 10 is a fragmentary section taken on section line 10—10 of FIG. 3.

The novel brake cylinder release valve mechanism 10 of this invention is shown by way of example as mounted on a vehicle 11, such as a railway car, in association with other brake apparatus components of such vehicle (see FIG. 1). The associated brake components are here shown as comprising a conventional control valve mechanism 12 of the triple valve type, such as an AB control valve mechanism, a brake pipe 13 extending from a conventional angle cock 14 to such control valve mechanism, and a conventional brake cylinder 15. The associated components also include reservoir means 16 which is connected with the control valve mechanism 12 and is here shown as comprising auxiliary and emergency reservoir sections 16$^a$ and 16$^b$.

The vehicle 11 is shown only in plan outline and the novel release valve mechanism 10 is mounted on the end portion 11$^a$ thereof which carries a conventional coupler device 17. The coupler device 17 includes an actuating member pivoted on the end portion of the vehicle and having a handle 18 in the customary location adjacent the outer side of the vehicle. As will be further explained hereinafter, the novel valve mechanism 10 includes a housing 19 and is in the form of a unit mounted on the end portion 11$^a$ of the vehicle in adjacent relation to the coupler actuating handle 18 so that this valve mechanism will be conveniently accessible for manual actuation by an operator from the same general location that he would be in when he carries out the customary manipulations for coupling and uncoupling of the vehicle.

The brake cylinder 15 is connected with the control valve mechanism 12 by the usual pipeline 20 extending thereto, as shown in FIG. 1, and the release valve mechanism 10 is connected with the brake cylinder by being interposed in this pipeline. The valve mechanism 10 preferably includes a pipe bracket 21 which is suitably located on the vehicle, such as on the underside of the body thereof, and to which the housing 19 of the valve mechanism 10 is attached.

As shown in FIGS. 3 and 5, the pipe bracket 21 has fluid passages 22 and 23 therein which are connected respectively with the control valve mechanism 12 and the brake cylinder 15 by the pipe members 20$^a$ and 20$^b$. The passages 22 and 23 include a pair of ports 24 and 25 in a side wall 26 for open communication with passages of the valve mechanism 10, as explained hereinafter, when the housing 19 of this mechanism is attached to the pipe bracket 21 as by suitable connecting screws 27. The passage 22 can be referred to as the control valve passage and communicates with the fluid pressure inlet of the valve mechanism 10. The passage 23 can be referred to as the brake cylinder passage and is in communication with the outlet of the valve mechanism 10.

The valve mechanism 10 comprises, in general (see FIG. 3), a brake cylinder pressure releasing valve means 28 and a brake cylinder pressure retaining valve means 29 located in the housing 19, in this case, in an adjacent relation with their operating axes disposed in substantially parallel planes. The valve mechanism 10 also comprises actuating means 30, in this case a manually operable means actuatable from either side of the vehicle 11, for causing selective actuation of the releasing valve means 28 and the retaining valve means 29.

The housing 19 comprises a pair of upper and lower housing sections 19ª and 19ᵇ connected by screws 31 so as to clamp therebetween a suitable gasket 32 having a movable diaphragm portion 33. The housing 19 contains upper and lower diaphragm chambers 34 and 35 lying on opposite sides of the diaphragm 33, and a connecting passage 36 connecting the chambers 34 and 35 by extending around the diaphragm. The housing 19 also contains an upper valve chamber 37 which is connected with the brake cylinder passage 23 of the pipe bracket 21 through the port 25, and a lower valve chamber 38 which is adapted to be connected with the atmosphere through a vent passage 39 provided in the lower housing section 19ᵇ.

Additionally, the housing 19 contains a valve chamber 40 in which the retaining valve means 29 is located, and a return passage 41 for fluid returning from the brake cylinder 15 and which return passage is adapted to be connected with the lower valve chamber 38 through the retaining valve means. The lower diaphragm chamber 35 is normally in communication with the valve chamber 38 through a short connecting passage 42. An annular valve seat 43 is provided for the vent passage 39 and an annular valve seat 44 is provided for the connecting passage 42.

The vent passage 39 is normally closed and is controlled by a vent valve member 45 having a normally-closed position in engagement with the valve seat 43. The connecting passage 42 is normally open and is controlled by a shut-off valve member 46. The valve members 45 and 46 are mounted on a valve disk 47 and are connected with a valve stem 48 disposed in a vertical-axis relation in the housing 19. The valve member 45 is normally urged toward the seat 43 by the expansive action of a first spring 49 disposed around the valve stem 48, and by a second spring 50 acting against the upper side of the diaphragm 33. The valve members 45 and 46 are connected with the valve stem 48 as by snap rings 51 and 52 located above and below these valve members.

The lower diaphragm chamber 35 is continuous communication with the control valve mechanism 12 through the control valve passage 22, and is also normally in communication with the lower valve chamber 38 through the connecting passage 42. The valve members 45 and 46 face in axially opposite directions so that when the vent valve 45 is opened by upward movement imparted to the stem 48 in a manner to be explained hereinafter, the valve member 46 will be moved into engagement with the seat 44 for closing the connecting passage 42.

The upper diaphragm chamber 34 is connected with the upper valve chamber 37 by a short connecting passage 54 but communication is normally interrupted by a check valve member 55 which is urged toward engagement with a valve seat 56 by a spring 57 disposed around an upper valve stem 58. The check valve member 55 is secured on the stem 58 by upper and lower snap rings 59 and 60.

The upper valve stem 58 is located on the same vertical axis as the lower valve stem 48 and the vent passage 39, and is guided by having the upper end thereof slidable in a guide opening 62 of the housing 19 and the lower end thereof slidable in a guide sleeve 63 supported by the diaphragm 33. The upper end portion of the lower valve stem 48 is attached to the diaphragm 33 as by a snap ring 64 and extends through the diaphragm into the guide sleeve 63 so as to be engageable with the lower end of the upper valve stem 58 for imparting lifting movement to the latter. The lower end portion of the lower valve stem 48 is guided in an insert member 66 provided in the lower housing section 19ᵇ.

The insert member 66 is provided with a group of axial passages 67 by which the lower valve chamber 38 is connected with the vent passage 39 when the valve member 45 has been lifted off of the valve seat 43. The upward movement of the stem 48 for opening the valve members 45 and 55 and closing the valve member 46 is imparted thereto by a follower member 68 having a relatively short stem 69 slidable in the insert member 66. The lifting movement of the follower member 68 is imparted thereto by a portion of the actuating means 30 as will be later explained.

From the general arrangement described above for the valve members 45, 46 and 55, it will be recognized that the valve members 46 and 55 control communication between the control valve mechanism 12 and the brake cylinder 15 and that the valve member 45 controls the vent passage 39. Before describing the action of these valve members in greater detail, the retaining valve means 29 should be described, and this will be done next.

The retaining valve means 29 comprises upper and lower valve members 72 and 73 of which the upper valve member 72 is a check valve member having a normally-closed position in engagement with a valve seat 74 and is urged thereagainst by a spring 75 disposed around a valve stem 76. The check valve member 72 is connected with the valve stem 76 as by means of upper and lower snap rings 77 and 78 and controls the return passage 41 from the brake cylinder 15.

The lower valve member 73 is carried by a hollow valve body 79 and is engageable with a valve seat 80 formed on the housing section 19ᵇ. The valve body 79 is hollow and is disposed around the valve stem 76 so as to provide a spring chamber 81 in which the spring 75 is located. The valve body 79 is provided at the upper end thereof with a guide sleeve portion 82 which is slidable in a guide opening 83 of the housing member 19ᵇ and is provided with radial connecting ports 84. The upper end of the valve body 79 has a central opening 85 through which the upper end of the spring 75 projects for urging the check valve member 72 against its seat 74.

The spring chamber 81 is provided in the lower end thereof with spring seat means in the form of a plug member 86 slidably mounted in the hollow valve body 79 and closing the lower end thereof. The lower end portion of the valve body 79 carries a grooved external collar 87 which is slidable in a lower guide opening 88 of the housing member 19ᵇ. A suitable packing 89 is provided in the groove of the collar 87, and a suitable packing 90 is provided on the plug member 86 for sealing engagement with the inner wall of the valve body 79.

The lower end of the plug member 86 projects from the valve body 79 as a follower means 93 which is in engagement with a portion of the actuating means 30 as is further explained hereinafter. A second spring 94, disposed in the spring chamber 81, is reactively effective against the plug member 86 and urges the lower valve member 73 into engagement with its associated valve seat 80.

The return flow of fluid from the brake cylinder 15 through the passage 41 is controlled by the check valve member 72 in accordance with the loading of the spring 75 so that different desired fluid pressures can be retained in the brake cylinder for maintaining a partially applied condition of the vehicle brakes. The variation in the loading of the spring 75 is achieved by adjusting movement of the actuating means 30 in the manner explained hereinafter.

The fluid returning from the brake cylinder 15 opens the check valve member 72 and flows into the lower valve chamber 38 by passing through the radial ports 84 if the lower valve member 73 is open or, if the latter valve member is closed, by passing through a restricted passage 96 provided in the valve body 79. When the valve member 73 is in its closed position against the associated valve seat 80 by reason of a loaded condition of the spring 94, the return fluid flows into the spring chamber 81 through the central opening 85 and then into the valve chamber 38 through the restricted passage 96. When the valve member 73 is in an open position by reason of an unloaded condition of the spring 94, the returning fluid need not pass through the spring chamber 81 nor the restricted passage 96, but flows directly into the valve chamber 38 by passing through the radial ports 84 and between the valve member 73 and its associated seat 80.

The actuating means 30 will be described next. The actuating means 30 is preferably common to the pressure releasing valve means 28 and the retaining valve means 29 so that these two valve devices can be selectively actuated by two different movements manually imparted to the actuating means, as will be presently explained. The actuating means 30 includes shaft means 99 extending into or through the housing 19 on an operational axis extending transverse to the parallel axes of the releasing valve means 28 and the retaining valve means 29 and which shaft means comprises a pair of axially aligned shaft members 100 and 101.

The shaft member 100 extends through the portion of the housing containing the retaining valve means 29, and the shaft member 101 extends through the portion of the housing containing the releasing valve means 28. The shaft member 100 is provided at the outer end thereof with a suitable actuating handle 102 located on one side of the vehicle 11 as shown in FIG. 1 and, at the inner end thereof, is connected with the shaft member 101 by a transverse connecting pin 103 so that pushing and pulling movements in opposite directions can be imparted to the shaft member 101 through the shaft member 100 for actuation of the releasing valve means 28. The shaft member 101 extends to the opposite side of the vehicle 11 and has a similar handle thereon to which pushing and pulling movements can also be applied.

The handle member 102 also imparts rotative movement to the shaft member 100 in either direction for actuation of the retaining valve means 29, that is, for varying the pressure control setting thereof. The rotation of the shaft member 100 also produces rotation of the shaft member 101, but the rotation of the latter shaft member as thus produced is merely an idle movement and has no effect upon the releasing valve means 28. The rotation of the shaft member 100 can also be produced by movement transmitted thereto from the handle on the opposite side of the vehicle 11 by the shaft member 101. The different rotative positions to which the handle 102 is manually moved are indicated by a pointer 105 connected therewith for movement to different control pressure settings represented by indicia wording 106 provided on the front wall 107 of the lower housing member 19b.

The actuating means 30 includes a first actuator portion 110 for the releasing valve means 28 and a second actuator portion 111 for the retaining valve means 29. The actuator portion 110 is responsive to axial shifting of the shaft member 101 produced by the handle 102 and is here shown as a spool-shaped cam having oppositely tapered annular cam surfaces 110a and 110b, in this case, formed directly on this shaft member and sloping away from an annular groove 112 located therebetween. The spool-shaped cam portion 110 is co-operable with the follower member 68 for producing the above-mentioned lifting thereof and the thrust engagement of the shaft portion 69 with the lower end of the valve stem 48.

The follower member 68 is normally engaged in the annular groove 112 at which time rotation of the shaft member 101 will not result in any operating effect on the follower member. If a pushing or pulling movement is imparted to the shaft member 101, however, one or the other of the cam surfaces 110a and 110b will actuate the follower member 68 to lift the same and cause upward actuating movement of the valve stem 48 for opening the vent valve member 45 and closing of the shut-off valve member 46. The upward actuation of the valve stem 48 thus produced by the follower member 68 also causes opening movement of the check valve member 55 in opposition to the spring 57.

The second actuator portion 111 of the actuating means 30 is here shown as a drum member rotatably mounted in a cylindrical recess 108 of the housing section 19b and connected with the shaft member 100 by a transverse pin 113 extending through a longitudinal slot 114 of this stem member. The walls of the slot 114 are effective against the pin 113 for rotating the drum member 111 in response to rotation of the shaft member 100, but are ineffective against the pin during axial shifting of the shaft member 100. The presence of the slot 114 in the shaft member 100 therefore permits longitudinal shifting of the shaft member 101 without imparting movement to the drum member 111, and conversely, provides for rotation of the drum member in response to rotation of the shaft member 100 without causing any camming action of the actuator portion 110 against the follower member 68.

To enable actuating means 30 to alter the fluid pressure setting of the retaining valve means 29 the rotatable drum member 111 is provided with an annular series of cam portions 115, 116, 117 and 118 of progressively varying height as shown in FIG. 6. These cam portions are selectively engageable with the follower means 93 in response to rotation of the shaft member 100 for varying the loading of the springs 75 and 94. The cam portions 115 and 118 are high and low cam portions respectively, and the intermediate cam portions 116 and 117 are of first and second intermediate heights respectively.

The drum member 111 is retained in the cylindrical recess 108 as by a snap ring 120, and suitable packings 121 and 122 are provided for the drum member and shaft member 100 respectively. A pair of springs 124 and 125 provided on the shaft member 100 on axially opposite sides of the drum member 111 normally hold this shaft member in a position relative to the drum member as shown in FIG. 3, but permit axial sliding of the shaft member 100 through the drum member 111 for actuating the shaft member 101 in response to a pushing or pulling force imparted to the handle 102.

Rotation of the drum member 111 by the handle 102 causes a desired one of the cam portions 115, 116, 117 and 118 to come into engagement with the follower means 93 and to shift the latter along the operating axis of the retaining valve means 29 to produce the desired loading or unloading of the springs 75 and 94. The drum member 111 is retained in any desired rotative position to which it has been moved, as by a detent ball 127 provided in a detent passage 128 of the housing section 19b and co-operable with one of a series of detent recesses 130 provided in the drum member. The detent ball 127 is urged into holding engagement in a selected one of the detent recesses 130 by a spring 132.

When the handle member 102 is rotated to the position with the pointer 105 designating the high retainer pressure setting represented by the indicia 106a of FIG. 4 the high cam portion 115 will be in engagement with the follower means 93, as shown in FIGS. 3 and 10, and the springs 75 and 94 will then be in their maximum loaded condition and the pressure of the fluid retained in the brake cylinder by the check valve member 72 will be of maximum pressure value such as a pressure of 20 p.s.i. While the high cam portion 115 is in the effective position just described, the loading to which the spring 94 is subjected will cause the valve member 73 to be maintained in engagement with the valve seat 80 so that the return fluid flowing past the check valve member 72 must travel through the restricted passage 96 of the valve body 79. The checking action of the valve member 73 and the restricting area of the passage 96 together will then retard the return flow of fluid from the brake cylinder 15 to the maximum extent and cause a maximum retaining action for the vehicle brakes.

When the first intermediate cam portion 116 is in engagement with the follower means 93, the same general functioning of the retaining valve means 29 will take place but the loading of the spring 75 is then somewhat less and the pressure of the fluid retained in the brake cylinder 15 by the check valve member 72 will be a correspondingly lower pressure, such as a pressure of 10 p.s.i. While the first intermediate cam portion 116 is in this effective position, the spring 94 will still be maintained in a sufficiently loaded condition to hold the valve member 73 in a closed position against the valve seat 80 so that the fluid being exhausted from the brake cylinder 15 must still pass through the restricted passage 96. The setting of the retaining valve means 29 will then be for the low retaining pressure designated by the indicia wording 106$^b$.

When the second intermediate cam portion 117 is in engagement with the follower means 93 the spring 75 will be substantially unloaded and the check valve member 72 will be openable by the return fluid with substantially no resistance to flow thereof, but the loading of the spring 94 will still be sufficient to hold the valve member 73 in engagement with the valve seat 80. Under these circumstances the restriction of the passage 96 will be the only retarding factor for the fluid being exhausted from the brake cylinder 15, and accordingly, the setting of the retaining valve means 29 will be for the slow direct exhaust designated by the indicia wording 106$^c$.

When the low cam portion 118 is in engagement with the follower means 93 the spring 94 is fully unloaded as well as the spring 75 and the valve member 73 will then be disengaged from the seat 80. At this time a relatively free flow of return fluid can take place from the brake cylinder 15 past the valve member 72 and through the ports 84 of the valve body 79 and then into the valve chamber 38 by flowing past the open valve member 73 without being required to pass through the restricted passage 96. The setting of the retaining valve means 29 will then be for the unrestriced direct exhaust designated by the indicia wording 106$^d$ which is the normal setting of the retaining valve means for functioning of the brake apparatus without any retaining action.

*Operation*

During normal operation of the brake apparatus of the vehicle 11, the setting of the retaining valve means 29 is in the direct exhaust position 106$^d$ at which time the low cam portion 118 of the actuating means 30 will be in engagement with the follower means 93. When an application of the vehicle brakes is made under these circumstances, the operation of the control valve mechanism 12 causes pressure fluid to be supplied to the brake cylinder 15 through the combination valve unit 10. The flow of pressure fluid is into the lower diaphragm chamber 35 through the passage 22 of the pipe bracket 21 and then through the connecting passage 42 into the valve chamber 38 and around the diaphragm 33 through the connecting passage 36 into the upper diaphragm chamber 34. The pressure fluid then flows past the check valve member 54 by imparting opening movement thereto in opposition to the spring 57 and in a direction toward the valve cylinder 15. From the check valve chamber 37 the fluid then flows through the passage 23 of the pipe bracket 21 and through the pipe member 20$^b$ to the brake cylinder 15 to actuate the latter and produce the desired applied condition of the brakes.

While pressure fluid is being thus supplied to the brake cylinder 15 both sides of the diaphragm 33 are subjected to the pressure of the fluid being thus supplied, and the vent valve member 45 will be retained in a closed position against its associated seat 43 by the downward thrust of the springs 49 and 50. At this time the diaphragm 33 is in a substantially fluid pressure balanced condition and merely transmits the downward thrust of the spring 50. The condition of the valve means 10 is then substantially as represented by the diagram of FIG. 6 and the vehicle brakes are in an applied condition.

In releasing the brakes of the vehicle 11 with the retaining valve means 29 set in its normal direct-exhaust condition referred to above, the functioning of the brake apparatus causes venting of the pressure fluid from the brake cylinder 15 through the valve means 10 and through the control valve mechanism 12. During this normal brake-releasing operation the brake cylinder fluid follows a return path through the check valve chamber 37 and the return passage 41 to the retaining valve means 29 and flows through the latter into the valve chamber 38 and then through the connecting passage 42 into the upper diaphragm chamber 35 from which it flows through the passage 22 of the pipe bracket 21 and the pipe member 20$^a$ and is exhausted to atmosphere through the exhaust passage of the control valve mechanism 12.

If the brakes are to be retained in a partially applied condition, the retaining valve means 29 will have been set by operation of the actuating means 30 to the proper setting for retaining the necessary pressure value in the brake cylinder 15. In that case the return flow of pressure fluid from the brake cylinder 15 to the control valve mechanism 12 will be retarded by the retaining valve means 29, in accordance with the functioning thereof explained above, for retaining the vehicle brakes in the desired partially applied condition. The condition of the valve means 10 when the retaining valve means 29 has been set for a retaining action is represented by the diaphragm of FIG. 9.

When direct venting of the brake cylinder 15 to atmosphere through the vent passage 39 of the valve means 10 is desired for a quick release of the vehicle brakes without need for any functioning of the control valve mechanism 12 and without loss of the pressure fluid supply stored in the reservoirs 16$^a$ and 16$^b$, the vent valve member 45 is moved to open position by operation of the actuating means 30 in the manner already explained above. The opening of the valve member 45 connects the brake cylinder return passage 41 directly with the atmosphere through the retaining valve means 29, the valve chamber 38, and the vent passage 39. The condition of the valve means 10 during this quick releasing action is represented in the diagram of FIG. 7.

The opening actuation of the vent valve member 45 is accompanied by a substantially simultaneous closing movement of the shut-off valve member 46 into engagement with the valve seat 44. This closes the connecting passage 42 and prevents the pressure fluid in the diaphragm chamber 35, in the control valve mechanism 12, and in the associated reservoirs 16$^a$ and 16$^b$ from being vented to atmosphere through the vent passage 39. While the valve member 46 is closed and the valve member 45 is open, the upper side of the diaphragm 33 will be substantially relieved from fluid pressure action thereagainst by reason of the upper diaphragm chamber 34 being then vented to atmosphere through the passage 39.

Since the connecting passage 42 is then closed by the valve member 46, the pressure fluid connection to the control valve mechanism 12 will remain in a charged condition and the pressure of the fluid in the diaphragm chamber 35 will act against the underside of the diaphragm 33 to maintain the valve member 46 closed and the valve member 45 open while the brake cylinder 15 is being vented through the passage 39. This fluid pressure differential responsive action of the diaphragm 33 makes it unnecessary for the operator to hold the actuating means 30 in the brake cylinder venting position. The condition of the valve means 10 when the quick release of the brake cylinder pressure has been accomplished, but before reclosing of the vent valve member 45, is represented in the diagram of FIG. 8.

The need for venting the pressure fluid from the brake cylinder 15 through the valve means 10 and the vent passage 39 thereof occurs under certain conditions of vehicle use, such as when the vehicle 11 has been disconnected from its power vehicle from which the control valve mechanism 12 receives its supply of pressure fluid through the brake pipe 13. When the pressure in the diaphragm chamber 35 is subsequently released, such as when the vehicle 11 is reconnected with its power vehicle or in some other manner, the springs 49 and 50 will thereupon cause reclosing of the vent valve member 45 and reopening of the shut-off valve member 46 to restore the valve means 10 to its normal condition. Thereafter the normal application and release of the vehicle brakes under the control of the control valve mechanism 12 will take place by the flow of fluid through the valve means 10 in a manner already explained above without causing any actuating movement of the valve members 45 and 46.

From the accompanying drawings and the foregoing detailed description it will be readily understood that this invention provides novel valve means for controlling the release of brake cylinder pressure, particularly for the venting of the brake cylinder fluid for a quick release of the vehicle brakes without loss of pressure fluid stored in the reservoirs of the vehicle, and for a controlled venting of the brake cylinder with a desired pressure retained therein. It will now also be understood that this invention provides novel valve means of this type comprising a unitary mechanism having a brake cylinder venting valve device and a retaining valve device in an adjacent relation in one and the same unit and selectively actuable by manually operable means so that, by mounting the unitary mechanism on a vehicle at a location adjacent other control members such as a coupler operating means, an angle cock, or other such devices, the control of the novel combined valve mechanism can be conveniently attended to by an operator from the same station as that at which he will be operating such other control devices of the vehicle.

It will now also be seen that when the novel value means 10 comprises a brake cylinder vent valve device and a retaining valve device in a unitary housing in such adjacent relation, the actuating means for these devices can be a common actuating means having a plurality of movements in different directions for producing selective actuation of these valve devices. Additionally, it will be recognized that when the retaining valve means is thus located in the same housing means as the vent valve means and for actuation by a common actuating means, it will not be necessary for an operator to go to a remote location, or climb onto the vehicle as has been necessary heretofore, to actuate the retaining valve device to a desired setting.

Although the novel brake cylinder release valve means of this invention has been illustrated and described herein to a somewhat detailed extent, it will be understood, of course, that the invention is not to be regarded as being correspondingly limited in scope but includes all changes and modifications coming within the terms of the claims hereof.

Having described our invention, we claim:

1. Brake cylinder release valve mechanism comprising; housing means having passage means adapted for connection with a conventional control valve mechanism of the triple valve type and an associated brake cylinder and including a vent passage; normally-closed releasing valve means in said housing means and controlling said vent passage; said passage means having an inlet for connection with said control valve mechanism and an outlet for connection with said brake cylinder so as to provide for fluid flow between said control valve mechanism and said brake cylinder in opposite directions through said passage means when said vent passage is closed by said releasing valve means; said passage means also having another passage portion for directing brake cylinder fluid from said outlet to said vent passage; retaining valve means in said housing means in a control relation to said other passage portion and actuatable to a controlled-vent position for a controlled venting of said brake cylinder; actuating means in said housing means and operable to cause selective opening actuation of said releasing valve means and said retaining valve means; and fluid pressure responsive diaphragm means in said housing means and responsive to fluid pressure in said inlet for maintaining said releasing valve means in open-vent position until said brake cylinder has been vented; said diaphragm means including spring means effective to automatically actuate said releasing valve means to closed-vent position.

2. Release valve mechanism as defined in claim 1 wherein said releasing valve means and said retaining valve means comprise first and second valve devices in an adjacent relation in said housing means; said actuating means being selectively movable in a plurality of directions one of which is a rotative movement and another is a linear movement; said actuating means comprising a first responsive means responsive to the rotative movement for causing the opening actuation of one of said valve devices, and a second responsive means responsive to the linear movement for causing the opening actuation of the other of said valve devices.

3. In brake cylinder release valve mechanism; housing means having passage means adapted to be connected with a brake cylinder and to be supplied with fluid pressure; said passage means including a vent passage to atmosphere and a return passage portion for fluid being vented from said cylinder; normally-closed vent valve means controlling said vent passage; retaining valve means controlling said return passage portion; said vent valve means and said retaining valve means comprising first and second valve devices in said housing means and disposed with their operating axes in substantially parallel planes; actuating means common to said first and second valve devices and having an operating axis extending transverse to the axes of said valve devices; said first valve device including a first follower means, and said actuating means having a longitudinally shiftable first cam means effective against said first follower means for causing opening of said vent valve means; and spring means associated with said second valve device and subject to variable loading to provide different fluid pressure settings for said retaining valve means; said second valve device including a second follower means, and said actuating means having a rotatably movable second cam means effective against said second follower means for varying the loading of said spring means.

4. Brake cylinder release valve mechanism as defined in claim 3 and comprising detent means associated with the rotatable cam means for releasably holding the latter in different rotative positions providing the different loadings for said spring means.

5. Brake cylinder release valve mechanism as defined in claim 3 and comprising handle means axially movable relative to said second cam means and connected with said first cam means for causing the longitudinal shifting of the latter cam means by such axial relative movement.

6. In brake cylinder valve mechanism; a housing; a brake cylinder vent valve device and a brake cylinder pressure retaining valve device in said housing and disposed with their operating axes in substantially parallel planes; actuating means selectively operable for opening said vent valve device and setting said retaining valve device for a desired retained-pressure value comprising shaft means rotatable on, and axially shiftable along, an operating axis extending transverse to the axes of said valve devices, and means for selectively imparting rotary and axial movements to said shaft means; said shaft means comprising a rotatable and axially shiftable first shaft member, and a second shaft member connected with said first shaft member for axial shifting thereby; and a first actuator cam means connected with said first shaft member for rotation thereby and actuatably effective on one of said valve devices, and a second actuator cam means connected with said second shaft member for axial shifting thereby and actuatably effective on the other of said valve devices.

7. A release valve mechanism for use in fluid communicating means connecting an air brake control valve mechanism with an associated brake cylinder comprising; housing means having passage means adapted to be connected with said communicating means including a vent passage to atmosphere; releasing valve means in said housing means normally closing said vent passage and being actuatable to open position for venting said brake cylinder; retaining valve means in said housing means and actuatable to a controlled-vent position for a partial venting of said brake cylinder; said releasing valve means and said retaining valve means comprising first and second valve devices having first and second follower means movable along the axes of said valve devices; and actuating means in said housing means extending transverse to said axes and operable in two directions comprising first and second actuator portions co-operable respectively with said first and second follower means for causing selective actuation of said first and second valve devices; one of said actuator portions being rotatable by the movement of said actuating means in one of said directions and the other actuator portion being longitudinally shiftable by the movement of said actuating means in the other of said directions.

8. Release valve mechanism as defined in claim 7 wherein said passage means includes an inlet for connection with said control valve mechanism and an outlet for connection with said brake cylinder for locating said passage means in a series relation in said communicating means so as to accommodate fluid flow through the latter in opposite directions between said control valve mechanism and brake cylinder while said vent passage is closed by said releasing valve means; the portion of said passage means extending between said releasing valve means and said outlet comprising first and second passage portions providing fluid flow paths in a parallel relation; and a first check valve means controlling said first passage portion and openable toward said brake cylinder for flow of pressure fluid to the latter; said retaining valve means comprising a second check valve means controlling said second passage portion and openable away from said brake cylinder for said partial venting of the latter.

9. In brake cylinder release valve mechanism; housing means having passage means including an inlet adapted to be supplied with pressure fluid, an outlet adapted to be connected with a brake cylinder, and a vent passage to atmosphere; said passage means comprising a first passage portion connecting said inlet with said outlet, and a second passage portion for directing brake cylinder fluid from said outlet to said vent passage; vent valve means having a first control position closing said vent passage and opening said first passage portion, and a second control position closing said first passage portion and opening said vent passage; spring means normally holding said vent valve means in said first control position; retaining valve means controlling said second passage portion; said vent valve means and said retaining valve means comprising first and second valve devices in an adjacent relation in said housing means; and actuating means common to said first and second valve devices and selectively movable in a plurality of directions comprising a first responsive means responsive to the movement in one direction for shifting said vent valve means from said first control position to said second control position, and a second responsive means responsive to the movement in another direction for causing actuation of said retaining valve means for venting fluid from said brake cylinder to a predetermined extent.

10. In brake cylinder release valve mechanism; housing means having passage means including an inlet adapted to be supplied with pressure fluid, an outlet adapted to be connected with a brake cylinder, and a vent passage to atmosphere; said passage means comprising a first passage portion connecting said inlet with said outlet, and a second passage portion for directing brake cylinder fluid from said outlet to said vent passage; vent valve means having a first control position closing said vent passage and opening said first passage portion, and a second control position closing said first passage portion and opening said vent passage; spring means normally holding said vent valve means in said first control position; pressure retaining valve means of the check valve type controlling said second passage portion and being settable to a predetermined brake cylinder retainer pressure; said vent valve means and said retaining valve means comprising first and second valve devices in said housing means and disposed with their operating axes in substantially parallel planes; and actuating means common to said first and second valve devices and having an operating axis extending transverse to the operating axes of said valve devices; said actuating means being both longitudinally shiftable and rotatably shiftable on its operating axis for causing selective actuation of said first and second valve devices; the longitudinal shifting movement of said actuating means being effective to cause movement of said vent valve means from one to another of said control positions, and the rotative shifting movement of said actuating means being effective to change the setting of said retaining valve means.

References Cited in the file of this patent

UNITED STATES PATENTS

| 786,288 | Herr | Apr. 4, 1905 |
| 960,133 | Woods | May 31, 1910 |
| 962,545 | Bickel | June 28, 1910 |
| 2,653,849 | James | Sept. 29, 1953 |